(12) United States Patent
Brahms et al.

(10) Patent No.: US 10,404,959 B2
(45) Date of Patent: *Sep. 3, 2019

(54) LOGGING EVENTS IN MEDIA FILES

(71) Applicants: Sony Corporation, Tokyo (JP); Sony Pictures Entertainment Inc., Culver City, CA (US)

(72) Inventors: Jason Brahms, Culver City, CA (US); Ryan Kido, Culver City, CA (US); Oleksandr Zhukov, Kiev (UA); Oleg Sharov, Kiev (UA)

(73) Assignees: SONY CORPORATION, Tokyo (JP); SONY PICTURES ENTERTAINMENT INC., Culver City, CA (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/157,202

(22) Filed: May 17, 2016

(65) Prior Publication Data

US 2017/0026628 A1    Jan. 26, 2017

Related U.S. Application Data

(63) Continuation of application No. 13/492,710, filed on Jun. 8, 2012, now Pat. No. 9,342,535, which is a (Continued)

(51) Int. Cl.
*H04N 9/82* (2006.01)
*G06F 16/13* (2019.01)
(Continued)

(52) U.S. Cl.
CPC .......... *H04N 9/8227* (2013.01); *G06F 16/13* (2019.01); *G06F 16/44* (2019.01); *G06F 16/532* (2019.01);
(Continued)

(58) Field of Classification Search
CPC ......... G06F 17/30058; G06F 17/30091; G06F 17/30277; G06F 17/3082; G06F 3/04842;
(Continued)

(56) References Cited

U.S. PATENT DOCUMENTS

RE41,939 E * 11/2010 Harradine ............ G11B 27/031
382/236
8,200,669 B1   6/2012 Iampietro et al.
(Continued)

FOREIGN PATENT DOCUMENTS

GB    2386782 A    9/2003

OTHER PUBLICATIONS

International Search Report and Written Opinion dated Apr. 30, 2012, issued in PCT/US12/20220, 8 pages.
(Continued)

*Primary Examiner* — Thai Q Tran
*Assistant Examiner* — Stephen R Smith
(74) *Attorney, Agent, or Firm* — Procopio, Cory, Hargreaves & Savitch LLP

(57) ABSTRACT

Logging events in a media file, including: providing a logger tool to allow a user to view media in multiple ways and to capture and validate key events within the media file; and tracking and logging events in the media file by adding information to the media file including locations of bars and tone, slates, content, logos, commercial blacks, quality control issues, subtitles, and captions.

17 Claims, 6 Drawing Sheets

Related U.S. Application Data continuation of application No. 13/026,134, filed on Feb. 11, 2011, now abandoned.

(60) Provisional application No. 61/429,720, filed on Jan. 4, 2011.

(51) Int. Cl.
| | | |
|---|---|---|
| *G06F 16/44* | (2019.01) | |
| *G06F 16/532* | (2019.01) | |
| *G06F 16/78* | (2019.01) | |
| *H04N 21/47* | (2011.01) | |
| *H04N 21/4143* | (2011.01) | |
| *H04N 21/81* | (2011.01) | |
| *H04N 21/8543* | (2011.01) | |
| *G06F 3/0484* | (2013.01) | |

(52) U.S. Cl.
CPC ..... *G06F 16/7867* (2019.01); *H04N 21/4143* (2013.01); *H04N 21/47* (2013.01); *H04N 21/8173* (2013.01); *H04N 21/8543* (2013.01); *G06F 3/04842* (2013.01)

(58) Field of Classification Search
CPC ............... H04N 21/4143; H04N 21/47; H04N 21/8173; H04N 21/8543; H04N 9/8227
USPC ................. 715/201, 719–726; 386/241, 248, 386/278–290; 707/736
See application file for complete search history.

(56) References Cited

U.S. PATENT DOCUMENTS

| | | | |
|---|---|---|---|
| 8,589,402 B1 | | 11/2013 | Iampietro et al. |
| 9,215,514 B1 * | | 12/2015 | Kline .................... G06Q 10/10 |
| 2001/0023436 A1 | | 9/2001 | Srinivasan et al. |
| 2003/0177503 A1 * | | 9/2003 | Sull ................... G06F 17/30796 |
| | | | 725/112 |
| 2004/0125124 A1 | | 7/2004 | Kim et al. |
| 2005/0165840 A1 | | 7/2005 | Pratt et al. |
| 2006/0085477 A1 | | 4/2006 | Phillips et al. |
| 2007/0250901 A1 | | 10/2007 | McIntire et al. |
| 2008/0040394 A1 | | 2/2008 | McGrath et al. |
| 2009/0094520 A1 * | | 4/2009 | Kulas ................ G06F 17/30056 |
| | | | 715/723 |
| 2009/0130681 A1 | | 5/2009 | Carroll |
| 2009/0196570 A1 | | 8/2009 | Dudas et al. |
| 2009/0210395 A1 | | 8/2009 | Sedam |
| 2009/0240692 A1 | | 9/2009 | Barton et al. |
| 2009/0285551 A1 | | 11/2009 | Berry |
| 2010/0095326 A1 | | 4/2010 | Robertson, III |
| 2010/0309379 A1 | | 12/2010 | Schoenblum et al. |
| 2010/0312596 A1 | | 12/2010 | Saffari et al. |
| 2010/0332527 A1 | | 12/2010 | Wang et al. |
| 2011/0030001 A1 * | | 2/2011 | Connery ................ G11B 27/28 |
| | | | 725/32 |
| 2011/0040754 A1 * | | 2/2011 | Peto ..................... G06F 17/218 |
| | | | 707/736 |
| 2011/0075990 A1 | | 3/2011 | Eyer |
| 2011/0083074 A1 | | 4/2011 | Jellison, Jr. et al. |
| 2012/0023522 A1 | | 1/2012 | Anderson et al. |
| 2012/0042251 A1 | | 2/2012 | Rodriguez |
| 2012/0078691 A1 | | 3/2012 | Tsai et al. |
| 2012/0102387 A1 | | 4/2012 | Badoiu et al. |
| 2012/0148216 A1 | | 6/2012 | Pavagada et al. |
| 2012/0159503 A1 | | 6/2012 | Shafiee et al. |
| 2013/0132839 A1 * | | 5/2013 | Berry .................. G11B 27/031 |
| | | | 715/719 |

OTHER PUBLICATIONS

International Search Report and Written Opinion dated Nov. 21, 2012 issued in PCT/US12/55213, 8 pages.

* cited by examiner

LOGGING EVENTS IN MEDIA FILES

CROSS-REFERENCE TO RELATED APPLICATIONS

The present application is a continuation application of U.S. patent application Ser. No. 13/492,710 (filed Jun. 8, 2012; now U.S. Pat. No. 9,342,535), which is a continuation application of U.S. patent application Ser. No. 13/026,134 (filed Feb. 11, 2011; now abandoned), which claims the benefit of priority under 35 U.S.C. § 119(e) of U.S. Provisional Patent Application No. 61/429,720, filed Jan. 4, 2011, entitled "Tech Logger."

BACKGROUND

Field of the Invention

The present invention relates to logging events, and more specifically, to displaying and logging events associated with media files.

Background

Creating lists of events for a video file by hand is tedious and prone to error. Reviewing a tape or video file in one tool while manually entering time codes in another can lead to mistakes and inconsistency. These types of problems can make it more difficult to consistently handle video files in a library.

SUMMARY

Embodiments of the present invention provide for displaying audio and video from data files and attaching metadata to the files.

In one implementation, a method of logging events in a media file is disclosed. The method includes: providing a logger tool to allow a user to view media in multiple ways and to capture and validate key events within the media file; and tracking and logging events in the media file by adding information to the media file including locations of bars and tone, slates, content, logos, commercial blacks, quality control issues, subtitles, and captions.

In another implementation, a logger tool to log events in video is disclosed. The logger tool includes: an adjustable filmstrip of thumbnails for at least a part of the video; at least one audio waveform for the video; timing information for the video; a plurality of events associated with the video and locations of the events in the video; at least one interface to display and playback the video and the at least one audio waveform; at least one interface to create, edit, and delete events for the video; at least one interface to create re-usable clips from the video; and at least one interface to edit, import, and copy events or groups of events within a file or across files.

In yet another implementation, a non-transitory tangible storage medium storing a computer program for logging events in a media file is disclosed. The computer program includes executable instructions that cause a computer to: enable a user to view media in multiple ways and to capture and validate key events within the media file; and track and log events in the media file by adding information to the media file including locations of bars and tone, slates, content, logos, commercial blacks, quality control issues, subtitles, and captions.

Other features and advantages of the present invention will become more readily apparent to those of ordinary skill in the art after reviewing the following detailed description and accompanying drawings.

DETAILED DESCRIPTION

Certain implementations as disclosed herein provide for displaying audio and video from data files and attaching metadata to the files. After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one implementation, a software tool referred to as a logger is used to log events in a media file, such as a movie. The logger tool provides a user interface allowing a user to view the video in multiple ways and add information to the file to track and log events in the file including the locations of bars and tone, slates, content, logos, commercial blacks, quality control issues, subtitles, and captions. The logger tool allows the user to capture and validate key events within the media file required to enable downstream automated post production processes and workflows.

In one implementation, the user interface provides access to the media file and also provides an interface to create, track, and edit events for that media file. The user interface allows automatic presentation and association of events with the media file at their proper location, which can improve throughput and quality of the data. Events can be generated manually by the user within the logger tool and also generated by importing lists or tables of events created externally. The events can then be associated with the media file within the logger tool. For example, a user can import a quality control report into the logger tool and the logger tool is used to create events for the file matching the quality control entries. In another implementation, the logger tool can also present information and views on frame matching and/or differentiation based on imported matched and/or differentiated data.

Figure 1:
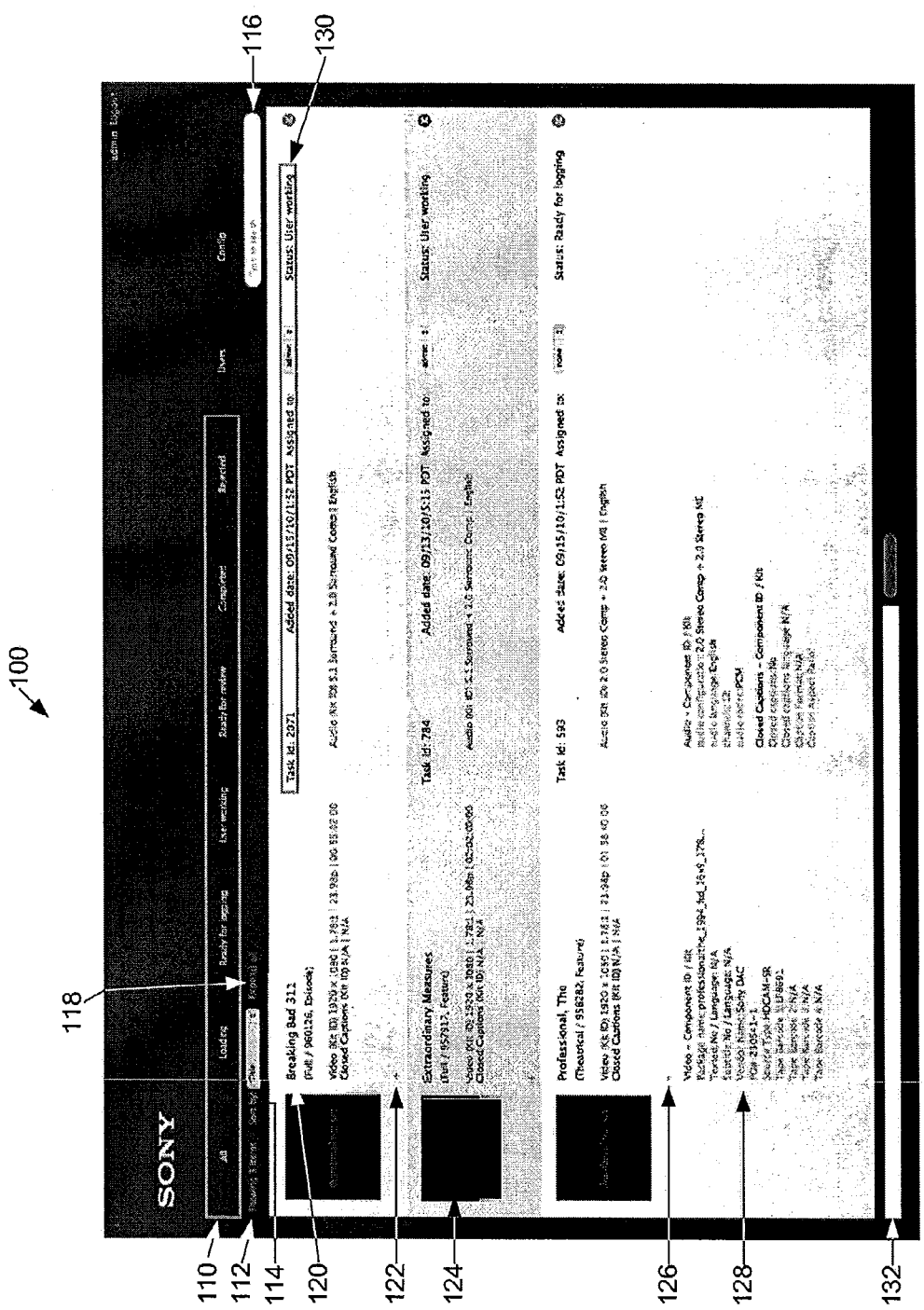
FIG. 1 shows a screen shot of a queue page of a logger in accordance with one implementation of the present invention.

FIG. 1 shows a screen shot of a queue page 100 of a logger in accordance with one implementation of the present invention. Queues shown on the queue page 100 are designed to track the progress of media files through each status of a logging process.

In the illustrated implementation of FIG. 1, the queue page 100 of the logger includes following items/fields: status bar 110, item counter 112, 'sort by drop-down' 114, search field 116, 'expand/collapse all' 118, title 120, identifiers 130, expand 122, thumbnail 124, collapse 126, file specs 128, 'add movie' field 132, and logout. The status bar 110 is clicked to display the files in the selected status, which includes All, Loading, Ready for Logging, User working, Ready for Review, Completed, and Rejected. The item counter 112 displays the number of files showing for the chosen status. The 'sort by drop-down' item 114 is clicked to select an identifier (e.g., Title, Status, Task Id, Added date, Feature, User assigned, and Kit Id) in which the files will be arranged and viewed. The search field 116 displays the files that meet the entered keyword criteria. The 'expand/collapse all' item 118 is clicked to expand or collapse additional file information (i.e., file specs) for all files in the current status. The title 120 includes a file name that is clicked to proceed to a video page of the logger. The identifiers field 130 shows file specific identifying information. The expand icon 122 is clicked to display additional file information. The thumbnail 124 shows a single frame selected to visually represent the file. The collapse icon 126 is clicked to hide additional file information. The file specs 128 show additional technical file information. The 'add movie' field 132 is used to insert a selected file not currently in the logger tool into a loading status.

Figure 2:
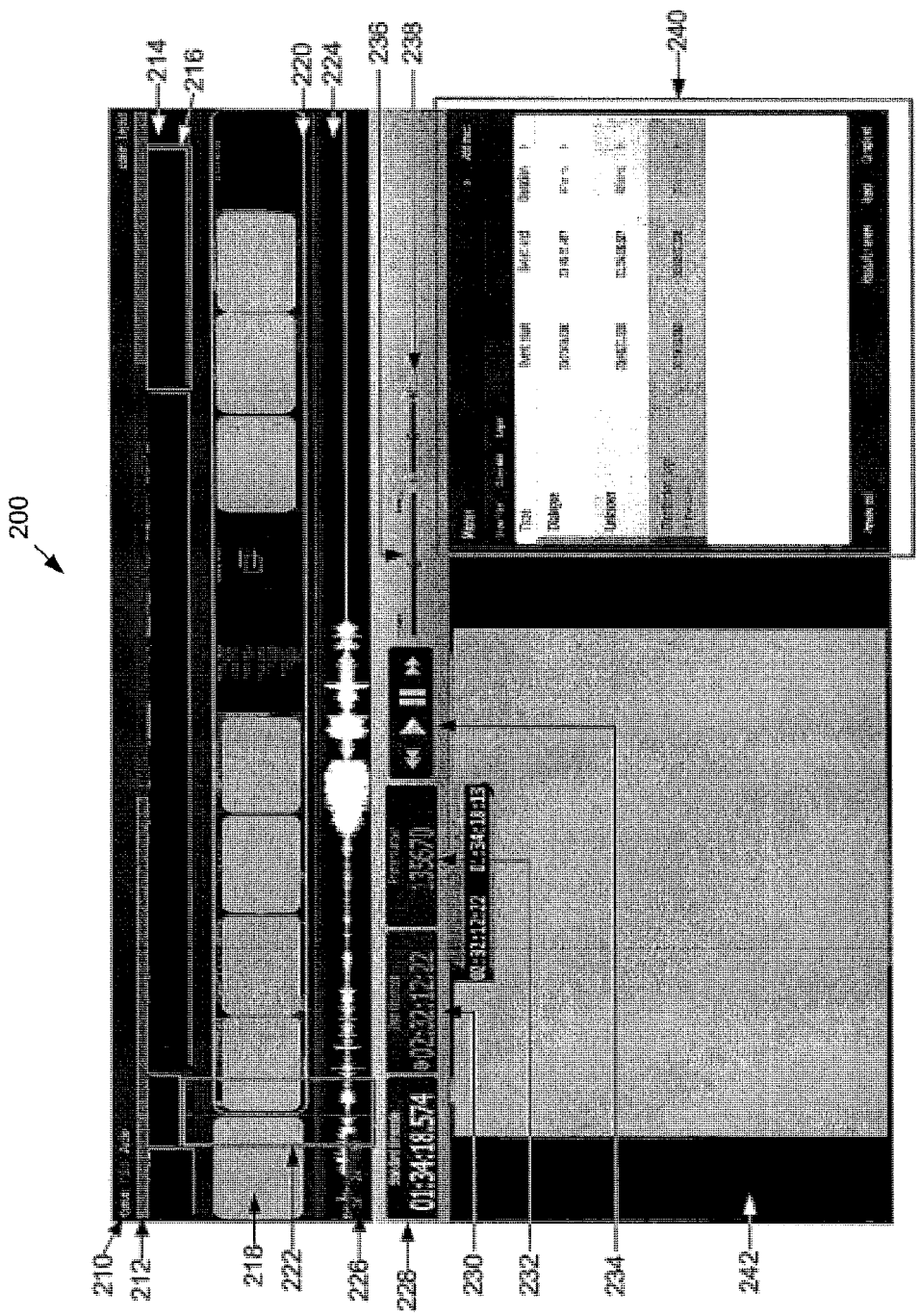
FIG. 2 shows a snapshot of a video page of the logger reached by clicking a title including a media file name.

FIG. 2 shows a snapshot of a video page 200 of the logger reached by clicking a title including a media file name (e.g., 120 in FIG. 1). In one implementation, the video page 200 of the logger includes sections, controls, and commands that are used to view, verify, and capture events. For example, the video page 200 of the logger provides/displays following: an adjustable filmstrip of thumbnails for all or part of a video file; audio waveforms for the video; the video with timing information (e.g., time code, tape time code, frame number); events associated with the video and their location in the file (e.g., by time code); interfaces to display and playback video and audio waveforms; interfaces to create, edit, and delete events for the video file; interfaces to create re-usable clips from a video file (e.g., creating new logos); interfaces for editing, importing, and copying events or groups of events within a file or across files; interfaces to a user through a web browser.

In the illustrated implementation of FIG. 2, the video page 200 includes following sections, controls, and commands: page selector 210, event overview 212, master strip 214, looking glass 216, event strip 218, event indicator 220, anchor 222, audio waveform 224, audio magnification 226, standard timecode 228, tape timecode 230, frame number 232, player controls 234, magnification slider 236, volume slider 238, player pane 242, and stack view 240. The page selector 210 is used to choose which page to view (e.g., Queue, Video, or Audio). The event overview 212 represents sections of the file containing events. In one case, known events and unknown events are represented by different colors.

The master strip 214 represents the entire file timeline from start to end. The looking glass 216 is located in the master strip 214 and magnifies the surrounded section of the file in the event strip 218. The default position of the looking glass 216 upon opening a new file contains the entire file. The event strip 218 is a magnified section located inside the looking glass 216 on the master strip 214 that can split the file into events. The event indicator 220 is a stroke that outlines each individual event. For example, a first thumbnail within the event indicator 220 is the first frame of the event, and a last thumbnail within the event indicator 220 is the last frame of the event. The anchor 222 is represented by a vertical line that crosses the event strip 218 and audio waveform which represents the location in the file. This file location will display in the player pane 242. The player controls 234 are buttons that control basic playback tasks such as playing, pausing, fast forwarding, and rewinding. The magnification slider 236 adjusts the size of the looking glass 216 which can increase or decrease the amount of the master strip 214 that is displayed in the event strip 218. The player pane 242 displays the frame located to the right side of the anchor 222. The stack view section 240 is the action center of the logger video page 200.

In one implementation, the video page 200 of the logger can be navigated using the sections, controls, and commands described above. For example, the master strip 214 can be navigated by clicking and dragging the looking glass 216 to the right or left to view different sections of the file in the event strip 218. The size of the looking glass 216 can be adjusted by moving the magnification slider 236 toward minutes to increase the size of the looking glass 216 and toward frames to decrease the size of the looking glass 216. In another example, the event strip 218 can be navigated by clicking and dragging the anchor 222 to the right or left along the event strip 218. The event strip 218 can be dragged to the right or left while the anchor 222 remains in the same location. Dragging the event strip 218 also moves the looking glass 216 in the master strip 214. When the desired event on the event strip 218 is clicked, the event strip 218 will move to place the anchor 222 before the first frame of the selected event. Either the Enter key can be pressed or the event on the event strip 218 can be clicked to also expand the event in the center of the strip 218. Up or down arrow key can be used to move to the next or previous event. In yet another example, when an event in the stack view 240 is selected, the event strip 218 will move to place the anchor 222 before the first frame of the selected event, and expand the event in the center of the event strip 218.

Figure 3A:
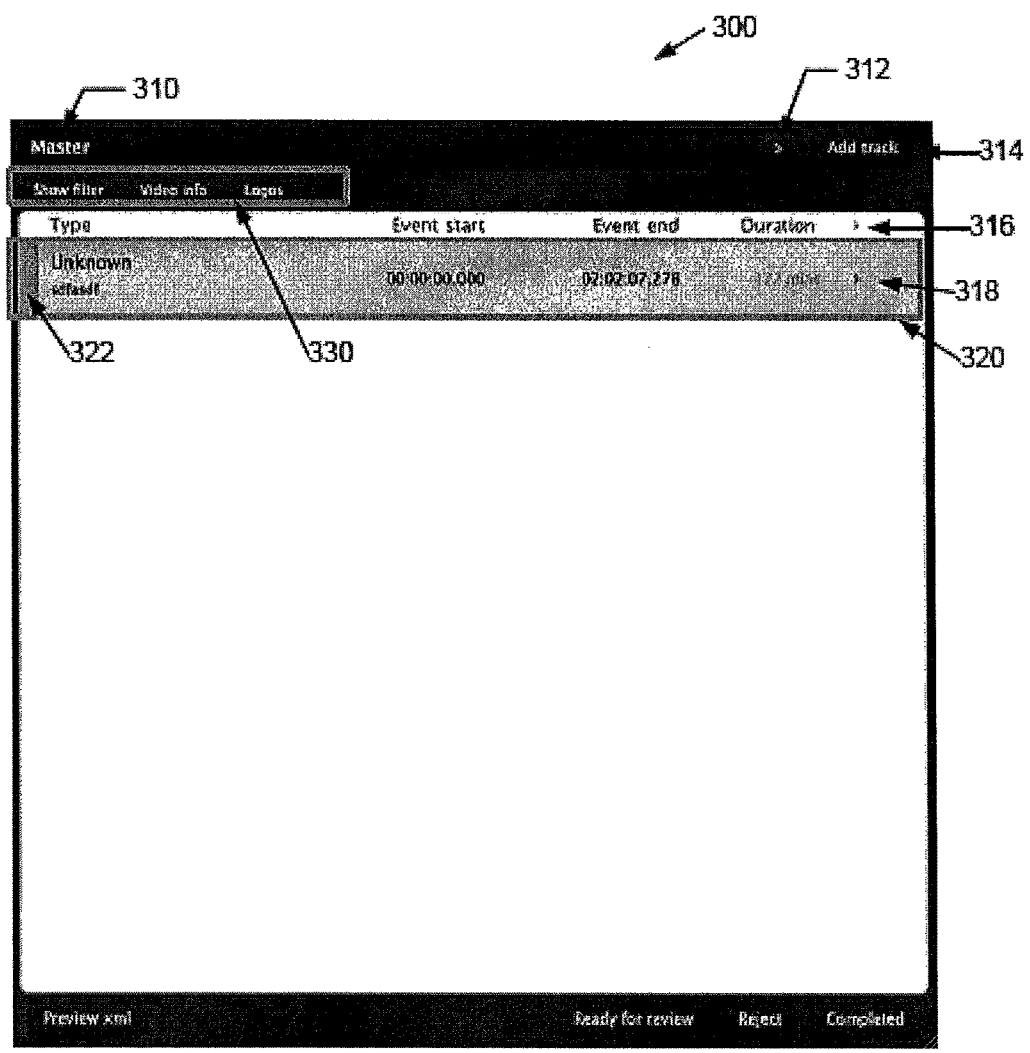
FIG. 3A shows a snapshot of a stack view in the video page of the logger in accordance with one implementation of the present invention.

FIG. 3A shows a snapshot of a stack view 300 in the video page 200 of the logger in accordance with one implementation of the present invention. The stack view 300 shows the tasks being completed as well as filter tools and other information. In the illustrated implementation of FIG. 3A, the stack view pane 300 includes track information 310 (including a track drop down button 312 and an add track button 314), tabs 330 for showing filters 332 (see FIG. 3B), video information 334 (see FIG. 3C), and logos 336 (see FIG. 3D), and event row 320. As described above, known events and unknown events can be represented by different colors 322. The stack view pane 300 further includes 'All Notes Expander' 316 and 'Notes Expander' 318. The track information 310 section provides options to: import quality control report, captions, subtitles, or script alignment; copy from a selected title; or create an unknown default event that represent the entire file.

Figure 3B:
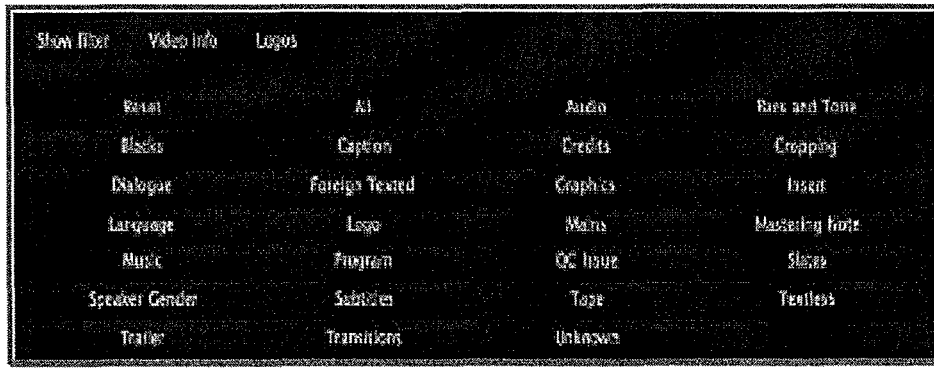
FIG. 3B shows a screenshot of a list of filters displayed when the filter tab is selected.

FIG. 3B shows a screenshot of a list of filters 332 displayed when the filter tab is selected. A selection of one or more filter from the list of filters allows viewing of the events contained in an individual track by category. Thus, the filter can be selected to show in the track only the events in that filter category. More than one filter can be turned on at one time to allow viewing of the events in the selected filter categories by pressing multiple filter buttons.

Figure 3C:
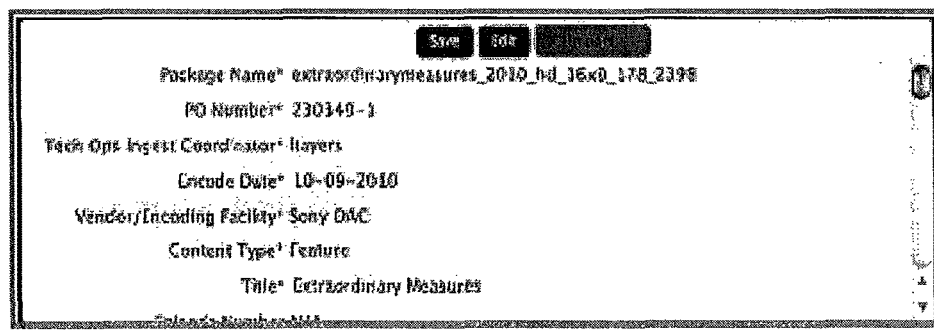
FIG. 3C shows video information displayed when the video info tab selected in the tabs area.

FIG. 3C shows video information 334 displayed when the video info tab selected in the tabs area 330. The video information 334 provides information such as frame rate, language, and other pertinent video information.

Figure 3D:
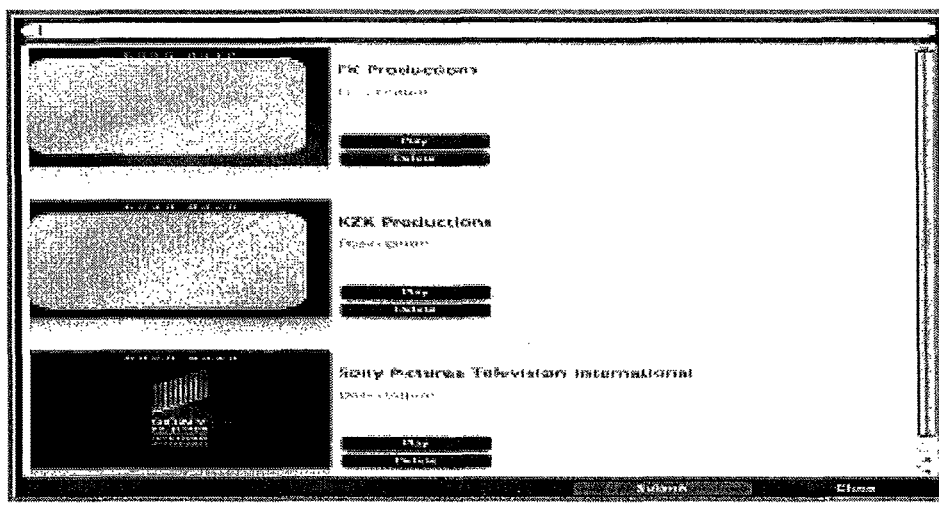
FIG. 3D shows logos information displayed when Logos is selected in the tabs area.

FIG. 3D shows logos information 336 displayed when Logos is selected in the tabs area 330. To view logos in the logos window of the stack view 300, click the logos button under the track name. To search logos, click to place the cursor in the search field with the logo window open. To create a new logo, execute the following steps: create an event that represents the logo from start to end; click on the 'edit mode' icon in the stack view for the event that contains the logo; choose 'Logo' in the event category menu and the corresponding logo type (e.g., Logo, Production Company Logo, Distribution Logo, or Production Logo); place the anchor on the frame that most accurately represents the logo in the event strip; click the 'OK' button or double-click the correct event type in the event category menu; type in the desired logo name in the search field when the logo window appears over the stack view; click the 'Create New' button; and click the 'submit' button to assign the newly created logo to the event when the new logo appears in the stack view.

Returning to FIG. 3A, each event row 320 will display the event type it has been assigned, the event description, duration, as well as start and end. The measurement of the duration and start and end information will display based on the highlighted measurement field. Each event type is represented by a different color 322 in the 'event type' column in the stack view 300. Table 1 shown below broadly defines the available event types.

TABLE 1

| Type | Category | Definition |
|---|---|---|
| Audio | Program Audio Start | |
| | Audio Fade Out | |
| | Audio "Two-Pop" | |
| | Audio Sync Point | A hard effect that can be used to sync the audio track with the visual queue. |
| Bars And Tone | Bars And Tone | SMPTE color bars together with a continuous 1000 Hz audio tone at the beginning of the file to calibrate playback equipment. |
| Blacks | Fade to Black | |
| | Blacks | |
| | Commercial Black | Periods of black picture over MOS placed where commercial breaks would be inserted. |
| | Black Roll-up/Pre-roll | Periods of black picture over MOS typically preceding bars and tone. |
| Caption | Caption | Verifying that the caption is correct and in sync with the video. |
| Credits | End Credit Start | |
| | End Credit End | Usually located at the end of program, credits contain information regarding the making of the program. |
| | Credits | |
| | Credits out of Safe Action | |
| | Credit Change | |
| | Scrolling end credits start | |
| | Foreign Credit/Dub Card | Credits that have been fully localized/White on black card that states the dub talent. |
| Cropping | Cropping | |
| Dialogue | Dialogue | |
| | Foreign Dialogue | |
| Foreign | Foreign Texted Start | |

TABLE 1-continued

| Type | Category | Definition |
|---|---|---|
| Texted | (by Language) Foreign Texted | |
| | Foreign Texted End (by Language) | Dialogue that is in a language other than the stated OV of the file. |
| Graphics | Foreign Texted Slate Graphics/Text Text Over Picture Text In Picture Graphics Overlay | |
| Insert | | Insert Start |
| | | Insert |
| | Insert End | Texted video clip that is meant to be inserted in program to take the place of texted OV material Insert Slate |
| Language Logo | Language Logo | |
| | Production Company Logo | Graphic and audio that represents the entity that produced the material. |
| | Distribution Logo | Graphic and audio that represents the line of business that is distributing the material. |
| | Production Logo (Customized to title) | Production Company Logo that has been integrated into program in such a fashion that it is not a standard production company logo. |
| Mains | Main Title Main Title Start Main Title End First Hard Cut after Mains Mains Over Picture Out of Safe Title Within Safe Action | |
| Mastering Note | Mastering Note | |
| Music Program | Music Program Start Program End Program | |
| QC Issue | QC - Picture issue QC - Audio issue | |
| xxxSlates | Slate Insert Slate | |
| | Program Slate | Information card that displays tape metadata relevant to the file such as feature title, aspect ratio, part - timecode, runtime, audio configuration, date P.O.#/ vendor facility, textless material, source material, etc. |
| | Trailers Slate Textless Slate | |
| Speaker Gender | Speaker Gender | |
| Subtitles | Subtitle (in picture) | Textual versions of the dialog in films and television programs, usually displayed at the bottom of the screen. They can either be a form of written translation of a dialog in a foreign language, or a written rendering of the dialog in the same language, with or without added information to help viewers who are deaf and hard-of-hearing to follow the dialog. |
| | Subtitle (component validation) | |
| Tape | Start of Reel/Part End of Reel MultiPart Join Parts | |
| Textless | Textless Textless Start | |
| | Textless End | Non-texted portions of the program located at the end of the file. Some titles do not have textless |

TABLE 1-continued

| Type | Category | Definition |
|---|---|---|
| | | material available. |
| | Textless Slate | |
| Trailer | Trailer (English) | |
| | Foreign Language | |
| | Trailer (by language) | |
| Transitions | Last Hard Cut | |

Each track includes at least one event that represents the entire file from beginning to end, or many imported or copied events that combined include the entire file. Each new event is a portion of an existing event. Thus, to create a new event, place the anchor on or directly in front of the first frame of the event to be created in the event strip. This will display the first frame of the event in the player pane. Select to split the current event into two events. The frame to the right of the anchor now represents the first frame of the new event and the frame to the left of the anchor represents the last frame of the previous event. The event will automatically be categorized as Unknown.

Figure 4A:
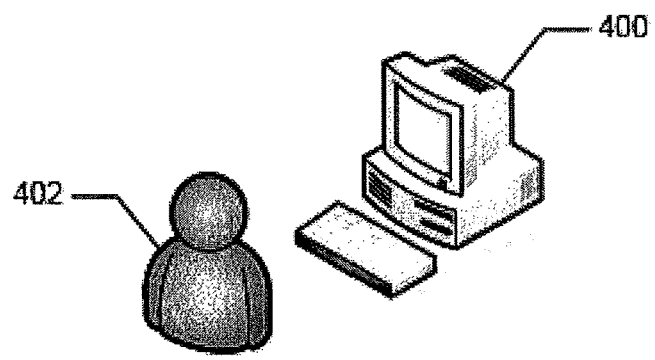
FIG. 4A illustrates a representation of a computer system and a user.

FIG. 4A illustrates a representation of a computer system 400 and a user 402. The user 402 uses the computer system 400 to log events in a media file, such as a movie. The computer system 400 stores and executes a logger 490.

Figure 4B:
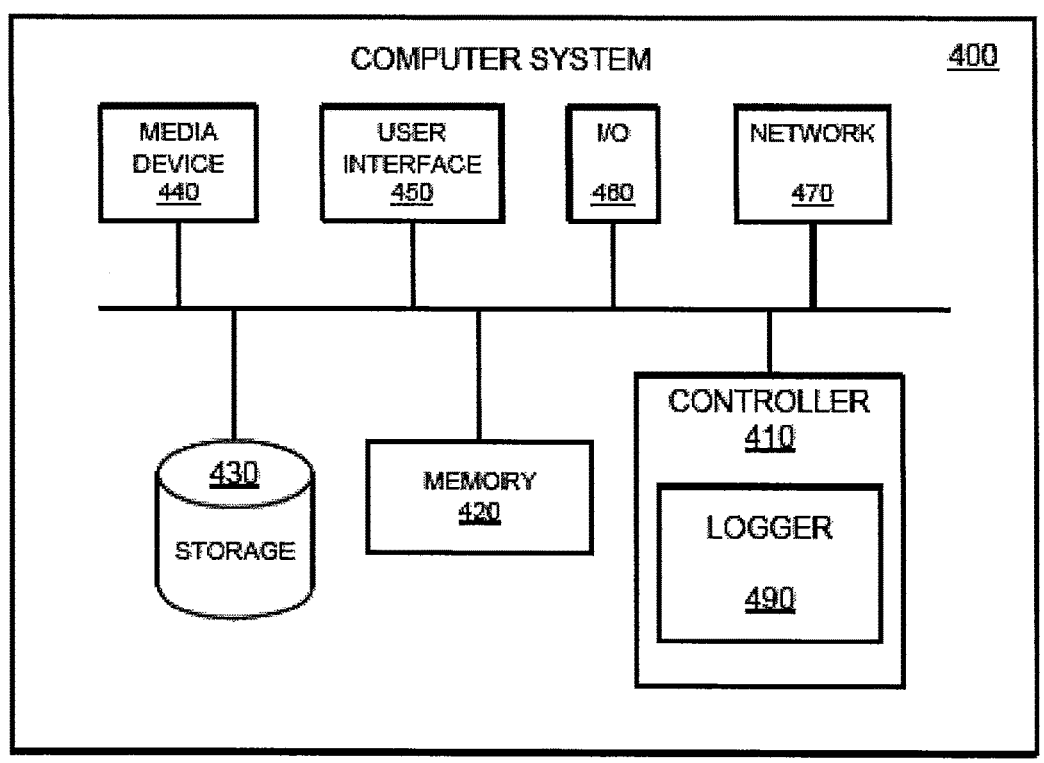
FIG. 4B is a functional block diagram illustrating the computer system hosting a logger.

FIG. 4B is a functional block diagram illustrating the computer system 400 hosting the logger 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the logger 490 as a software system, such as to enable logging of events in a media file. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the logger 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

Figure 5:
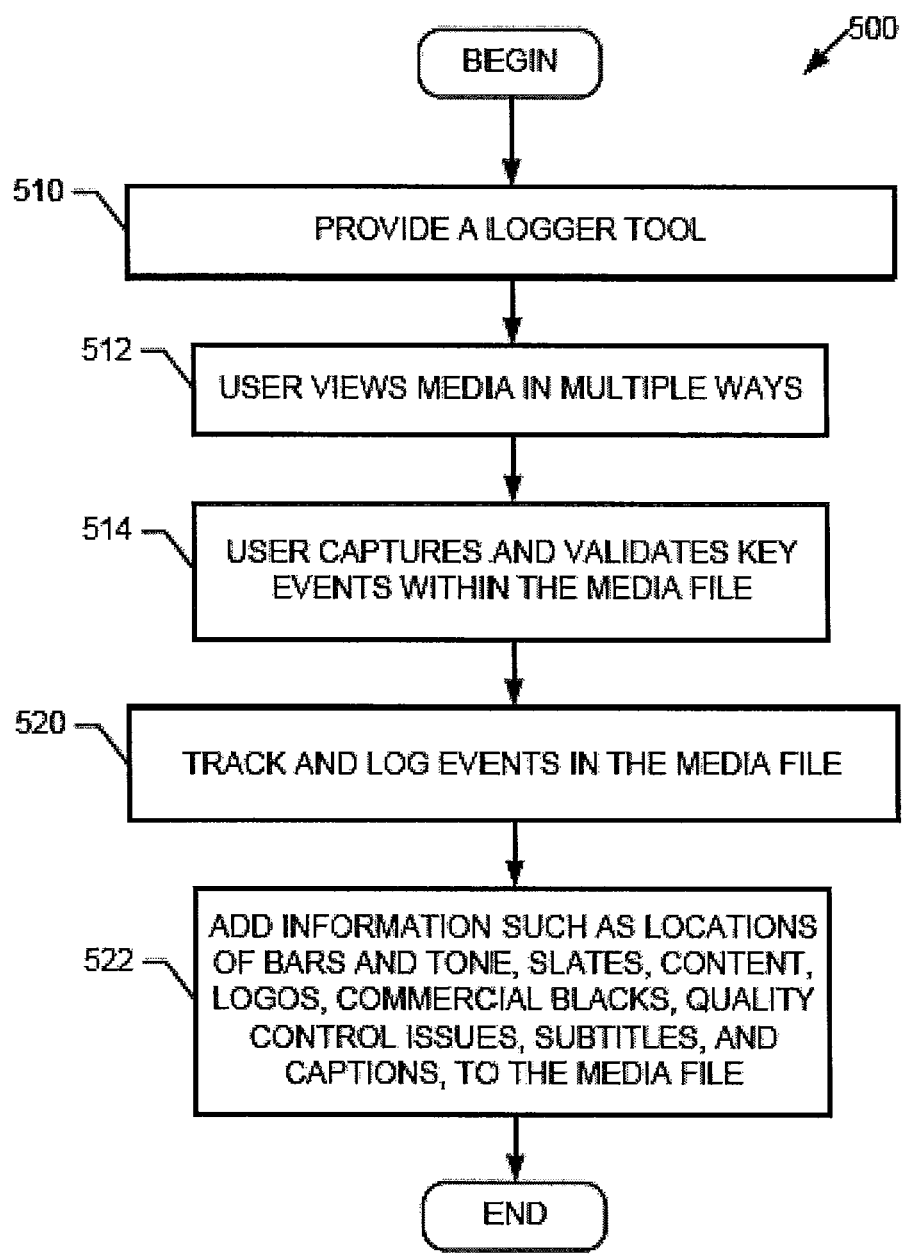
FIG. 5 is a flowchart illustrating a method of logging events in a media file in accordance with one implementation of the present invention.

FIG. 5 is a flowchart illustrating a method 500 of logging events in a media file in accordance with one implementation of the present invention. In the illustrated implementation, the method comprises configuring a logger tool, at box 510, to allow a user to view media in multiple ways (box 512). The user also captures and validates key events within the media file, at box 514. Events in the media file are tracked and logged, at box 520, by adding information to the media file, at box 522, including locations of bars and tone, slates, content, logos, commercial blacks, quality control issues, subtitles, and captions.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the examples focus on displaying and logging for movies, but a logger can be specialized for other video, such as television shows, internet video, or user generated content, or for audio, such as radio or podcasts. All features of each example are not necessarily required in a particular logger implementation. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of logging events in a media file using a logger tool, the method comprising:
   presenting the media file in a video page of the logger tool to enable a user to view the media file in multiple ways;
   capturing and validating key events within the media file using the video page of the logger tool;
   tracking and logging events in the media file using the video page of the logger tool;
   importing into the logger tool a list of entries about the events including locations of bars and tone, slates, content, logos, commercial blacks, quality control issues, subtitles, and captions; and
   generating the events for the media file corresponding to the list of entries.

2. The method of claim 1, wherein the logger tool is accessed through a web browser.

3. The method of claim 1, wherein presenting the media file comprises
   streaming the media file.

4. The method of claim 1, wherein presenting the media file comprises displaying the media file on a web page with a corresponding snapshot icon.

5. The method of claim 4, wherein displaying the media file comprises
displaying the logged events associated with a timeline of the media file on the web page.

6. The method of claim 1, further comprising importing the list of entries into the logger tool.

7. The method of claim 1, further comprising generating the list of entries.

8. The method of claim 1, wherein the list of entries is a quality control report having quality control entries.

9. The method of claim 1, wherein the entries about the events include locations of two or more of: bars and tone, slates, content, logos, commercial blacks, quality control issues, subtitles, and captions.

10. A method of logging events in a media file using a logger, the method comprising:
receiving a media file through a network;
receiving a create event command through the network;
creating an event overview indicating information about a plurality of events in the media file and presenting the event overview in a video page of the logger,
wherein the event overview includes a list of entries about the plurality of events including locations of bars and tone, slates, content, logos, commercial blacks, quality control issues, subtitles, and captions;
creating a first event in the media file using the video page of the logger;
receiving an edit event command through the network;
editing a second event in the media file using the video page of the logger;
receiving a delete event command through the network; and
deleting a third event in the media file using the video page of the logger.

11. The method of claim 10, further comprising
providing an interface for a user to capture and validate key events within the media file.

12. The method of claim 10, wherein creating a first event comprises
importing the plurality of events created externally and selecting an event from the plurality of events.

13. A computer for logging events in a media file using a logger tool, the computer comprising:
a web browser application configured to enable a user to view the media file in multiple ways, and to capture and validate the events in the media file using a video page of the logger tool,
wherein the video page includes a list of entries about the events including locations of bars and tone, slates, content, logos, commercial blacks, quality control issues, subtitles, and captions;
a tracking application to track and log the events in the media file using the video page of the logger tool,
wherein the events are occurrences in the media file which are required to perform an automatic post processing of the media file; and
a display configured to display at least one snapshot page of the media file,
wherein the at least one snapshot page includes at least the logged events associated with a timeline of the media file.

14. The computer of claim 13, wherein the logged events include known events and unknown events.

15. The computer of claim 13, wherein the logged events comprise at least one of
fade-to-black, text-over-picture, text-in-picture, logo-in-the-picture, main-title-start, main-title-end, music, speaker gender, subtitle, and transition.

16. The computer of claim 13, wherein the media file includes
streaming media downloaded from the Internet.

17. The computer of claim 13, further comprising
a network interface configured to receive the media file from the Internet.

* * * * *